United States Patent
Kim et al.

(10) Patent No.: US 9,253,482 B2
(45) Date of Patent: Feb. 2, 2016

(54) METHOD AND APPARATUS FOR SAMPLE ADAPTIVE OFFSET WITHOUT SIGN CODING

(71) Applicant: Texas Instruments Incorporated, Dallas, TX (US)

(72) Inventors: Woo-Shik Kim, Dallas, TX (US); Do-Kyoung Kwon, Allen, TX (US)

(73) Assignee: TEXAS INSTURMENTS INCORPORATED, Dallas, TX (US)

( * ) Notice: Subject to any disclaimer, the term of this patent is extended or adjusted under 35 U.S.C. 154(b) by 154 days.

(21) Appl. No.: 13/671,670

(22) Filed: Nov. 8, 2012

(65) Prior Publication Data
US 2013/0308696 A1 Nov. 21, 2013

Related U.S. Application Data

(60) Provisional application No. 61/557,040, filed on Nov. 8, 2011, provisional application No. 61/585,806, filed on Jan. 12, 2012.

(51) Int. Cl.
| | | |
|---|---|---|
| *H04N 19/00* | (2014.01) | |
| *H04N 19/182* | (2014.01) | |
| *H04N 19/176* | (2014.01) | |
| *H04N 19/117* | (2014.01) | |
| *H04N 19/14* | (2014.01) | |
| *H04N 19/82* | (2014.01) | |

(52) U.S. Cl.
CPC ....... *H04N 19/00303* (2013.01); *H04N 19/117* (2014.11); *H04N 19/14* (2014.11); *H04N 19/176* (2014.11); *H04N 19/82* (2014.11)

(58) Field of Classification Search
CPC .......... H04N 19/00896; H04N 19/00066; H04N 19/00884; H04N 19/00909; H04N 19/00551; H04N 19/00278; H04N 19/00951; H04N 19/00303; H04N 19/00533; H04N 19/00006; H04N 19/00121; H04N 19/00127; H04N 19/00
See application file for complete search history.

(56) References Cited

U.S. PATENT DOCUMENTS

| | | | | |
|---|---|---|---|---|
| 2012/0082241 A1* | 4/2012 | Tsai et al. | ................. | 375/240.25 |
| 2012/0082244 A1* | 4/2012 | Chen et al. | ................. | 375/240.29 |
| 2012/0177103 A1* | 7/2012 | Fu et al. | .................... | 375/240.02 |
| 2012/0207227 A1* | 8/2012 | Tsai et al. | ................. | 375/240.29 |
| 2012/0287988 A1* | 11/2012 | Chong et al. | ............. | 375/240.02 |
| 2013/0022103 A1* | 1/2013 | Budagavi | ................. | 375/240.02 |
| 2013/0051454 A1* | 2/2013 | Sze et al. | ................. | 375/240.02 |

(Continued)

OTHER PUBLICATIONS

Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/W11, pp. 1-217, Mar. 16-23, 2011, Geneva, Switzerland.

(Continued)

*Primary Examiner* — Jingge Wu
(74) *Attorney, Agent, or Firm* — Charles A. Brill; Frank D. Cimino

(57) ABSTRACT

A method and apparatus for sample adaptive offset without sign coding. The method includes selecting an edge offset type for at least a portion of an image, classifying at least one pixel of at least the portion of the image into edge shape category, calculating an offset of the pixel, determining the offset is larger or smaller than a predetermined threshold, changing a sign of the offset based on the threshold determination; and performing entropy coding accounting for the sign of the offset and the value of the offset.

25 Claims, 7 Drawing Sheets

(56) References Cited

U.S. PATENT DOCUMENTS

| | | | |
|---|---|---|---|
| 2013/0077696 A1* | 3/2013 | Zhou | 375/240.24 |
| 2013/0114681 A1* | 5/2013 | Zhao et al. | 375/240.03 |
| 2013/0114694 A1* | 5/2013 | Chen et al. | 375/240.03 |
| 2014/0098859 A1* | 4/2014 | Lim et al. | 375/240.12 |
| 2014/0119433 A1* | 5/2014 | Park et al. | 375/240.02 |

OTHER PUBLICATIONS

Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/W11, pp. 1-216, Jul. 14-22, 2011, Torino, Italy.

* cited by examiner

METHOD AND APPARATUS FOR SAMPLE ADAPTIVE OFFSET WITHOUT SIGN CODING

CROSS-REFERENCE TO RELATED APPLICATIONS

This application claims benefit of U.S. provisional patent application Ser. No. 61/557,040, filed Nov. 8, 2011, 61/585, 806, filed Jan. 12, 2012, which are herein incorporated by reference.

BACKGROUND OF THE INVENTION

1. Field of the Invention

Embodiments of the present invention generally relate to a method and apparatus for sample adaptive offset without sign coding, which maybe used for high efficiency video coding.

2. Description of the Related Art

Sample adaptive offset (SAO) was introduced for the next generation video coding standard called high efficiency video coding (HEVC). FIG. 1 is an embodiment depicting a block diagram for decoding Architecture of high efficiency video coding with adaptive loop filtering (ALF) and sample adaptive offset. As shown in FIG. 1, SAO is applied after deblocking filtering process, usually, before adaptive loop filtering (ALF).

SAO involves adding an offset directly to the reconstructed pixel from the video decoder loop in FIG. 1. The offset value applied to each pixel depends on the local characteristics surrounding that pixel. There are two kinds of offsets, namely band offset (BO) and edge offset (EO). BO classifies pixels by intensity interval of the reconstructed pixel, while EO classifies pixels based on edge direction and structure. In certain cases, the number of pixels increases but the number of bands stays the same. As a result, the system becomes less efficient.

Therefore, there is a need for an improved method and/or apparatus for a more efficient image and video coding using hierarchical sample adaptive band offset.

SUMMARY OF THE INVENTION

Embodiments of the present invention relate to a method and apparatus for sample adaptive offset without sign coding. The method includes selecting an edge offset type for at least a portion of an image, classifying at least one pixel of at least the portion of the image into edge shape category, calculating an offset of the pixel, determining the offset is larger or smaller than a predetermined threshold, changing a sign of the offset based on the threshold determination; and performing entropy coding accounting for the sign of the offset and the value of the offset.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
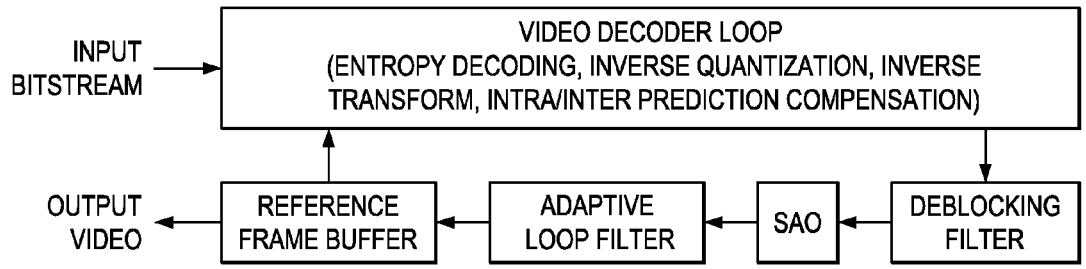
FIG. 1 is an embodiment depicting a block diagram for decoding architecture of high efficiency video coding with adaptive loop filtering and sample adaptive offset.
Figure 2:
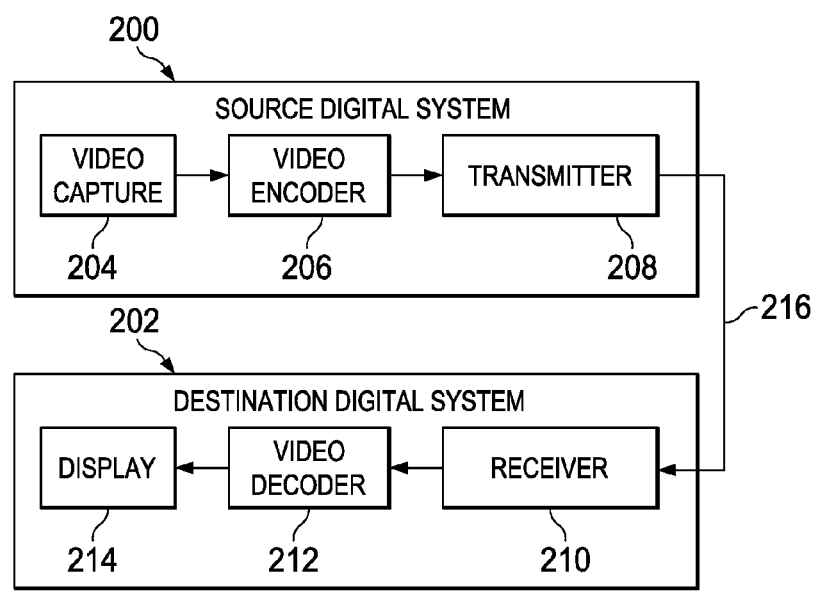
FIG. 2 is a block diagram of a digital system.

FIG. 2 is a block diagram of a digital system. FIG. 2 shows a block diagram of a digital system that includes a source digital system 200 that transmits encoded video sequences to a destination digital system 202 via a communication channel 216. The source digital system 200 includes a video capture component 204, a video encoder component 206, and a transmitter component 208. The video capture component 204 is configured to provide a video sequence to be encoded by the video encoder component 206. The video capture component 204 may be, for example, a video camera, a video archive, or a video feed from a video content provider. In some embodiments, the video capture component 204 may generate computer graphics as the video sequence, or a combination of live video, archived video, and/or computer-generated video.

The video encoder component 206 receives a video sequence from the video capture component 204 and encodes it for transmission by the transmitter component 208. The video encoder component 206 receives the video sequence from the video capture component 204 as a sequence of pictures, divides the pictures into largest coding units (LCUs), and encodes the video data in the LCUs. An embodiment of the video encoder component 206 is described in more detail herein in reference to FIG. 3.

The transmitter component 208 transmits the encoded video data to the destination digital system 202 via the communication channel 216. The communication channel 216 may be any communication medium, or combination of communication media suitable for transmission of the encoded video sequence, such as, for example, wired or wireless communication media, a local area network, or a wide area network.

The destination digital system 202 includes a receiver component 210, a video decoder component 212 and a display component 214. The receiver component 210 receives the encoded video data from the source digital system 200 via the communication channel 216 and provides the encoded video data to the video decoder component 212 for decoding. The video decoder component 212 reverses the encoding process performed by the video encoder component 206 to reconstruct the LCUs of the video sequence.

The reconstructed video sequence is displayed on the display component 214. The display component 214 may be any suitable display device such as, for example, a plasma display, a liquid crystal display (LCD), a light emitting diode (LED) display, etc.

In some embodiments, the source digital system 200 may also include a receiver component and a video decoder component and/or the destination digital system 202 may include a transmitter component and a video encoder component for transmission of video sequences both directions for video steaming, video broadcasting, and video telephony. Further, the video encoder component 206 and the video decoder component 212 may perform encoding and decoding in accordance with one or more video compression standards. The video encoder component 206 and the video decoder component 212 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 3:
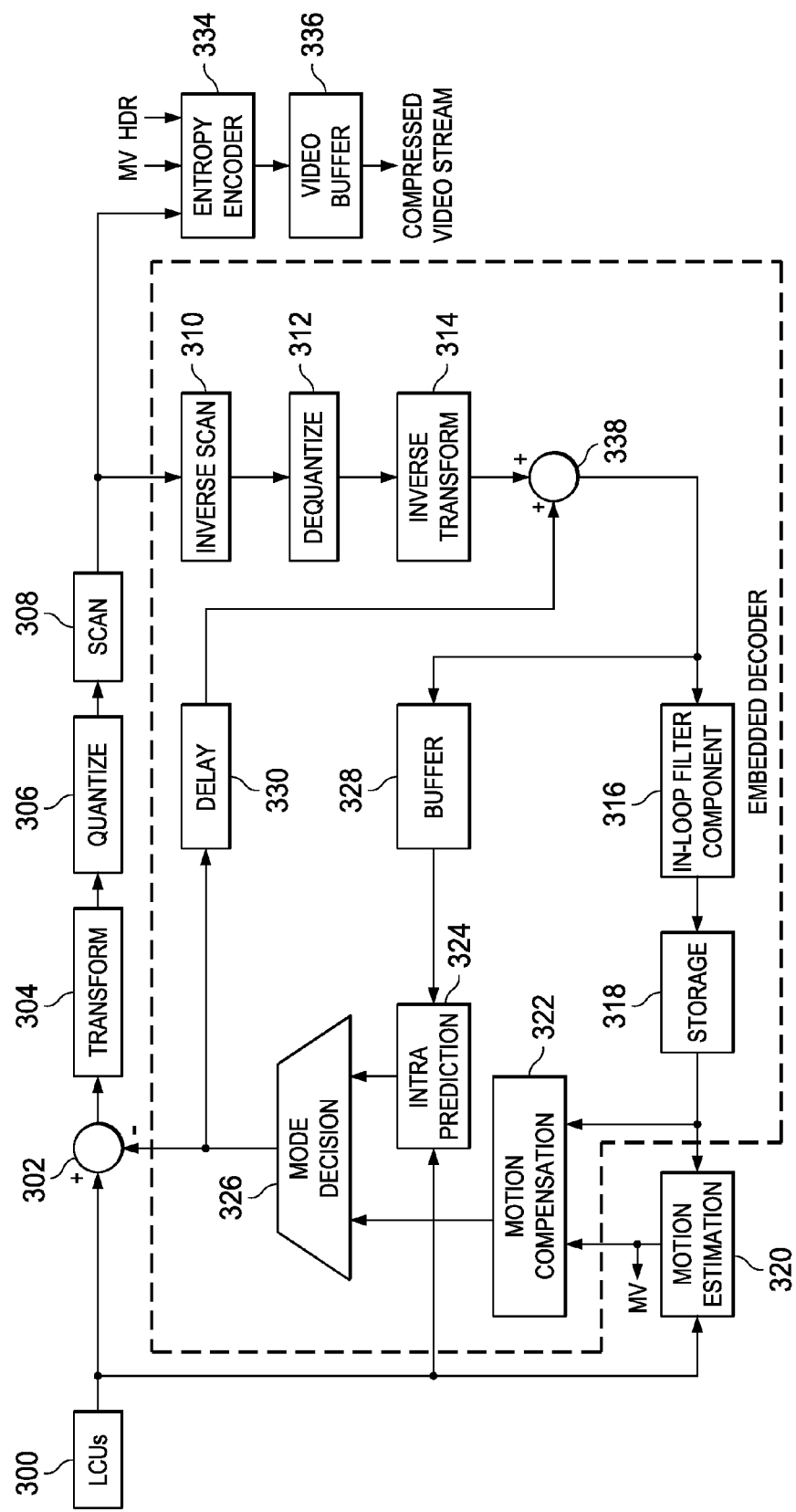
FIG. 3 is a block diagram of a video encoder.

FIG. 3 is a block diagram of a video encoder. FIG. 3 shows a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing. The coding control component also may determine the initial LCU CU structure for each CU and provides information regarding this initial LCU CU structure to the various components of the video encoder as needed. The coding control component also may determine the initial prediction unit and TU structure for each CU and provides information regarding this initial structure to the various components of the video encoder as needed.

The LCU processing receives LCUs of the input video sequence from the coding control component and encodes the LCUs under the control of the coding control component to generate the compressed video stream. The CUs in the CU structure of an LCU may be processed by the LCU processing in a depth-first Z-scan order. The LCUs 300 from the coding control unit are provided as one input of a motion estimation component 320, as one input of an intra-prediction component 324, and to a positive input of a combiner 302 (e.g., adder or subtractor or the like). Further, although not specifically shown, the prediction mode of each picture as selected by the coding control component is provided to a mode selector component and the entropy encoder 334.

The storage component 318 provides reference data to the motion estimation component 320 and to the motion compensation component 322. The reference data may include one or more previously encoded and decoded CUs, i.e., reconstructed CUs.

The motion estimation component 320 provides motion data information to the motion compensation component 322 and the entropy encoder 334. More specifically, the motion estimation component 320 performs tests on CUs in an LCU based on multiple inter-prediction modes (e.g., skip mode, merge mode, and normal or direct inter-prediction) and transform block sizes using reference picture data from storage 318 to choose the best motion vector(s)/prediction mode based on a rate distortion coding cost. To perform the tests, the motion estimation component 320 may begin with the CU structure provided by the coding control component. The motion estimation component 320 may divide each CU indicated in the CU structure into prediction units according to the unit sizes of prediction modes and into transform units according to the transform block sizes and calculate the coding costs for each prediction mode and transform block size for each CU. The motion estimation component 320 may also compute CU structure for the LCU and PU/TU partitioning structure for a CU of the LCU by itself.

For coding efficiency, the motion estimation component 320 may also decide to alter the CU structure by further partitioning one or more of the CUs in the CU structure. That is, when choosing the best motion vectors/prediction modes, in addition to testing with the initial CU structure, the motion estimation component 320 may also choose to divide the larger CUs in the initial CU structure into smaller CUs (within the limits of the recursive quadtree structure), and calculate coding costs at lower levels in the coding hierarchy. If the motion estimation component 320 changes the initial CU structure, the modified CU structure is communicated to other components that need the information.

The motion estimation component 320 provides the selected motion vector (MV) or vectors and the selected prediction mode for each inter-predicted prediction unit of a CU to the motion compensation component 322 and the selected motion vector (MV), reference picture index (indices), prediction direction (if any) to the entropy encoder 334

The motion compensation component 322 provides motion compensated inter-prediction information to the mode decision component 326 that includes motion compensated inter-predicted PUs, the selected inter-prediction modes for the inter-predicted PUs, and corresponding transform block sizes. The coding costs of the inter-predicted prediction units are also provided to the mode decision component 326.

The intra-prediction component 324 provides intra-prediction information to the mode decision component 326 that includes intra-predicted prediction units and the corresponding intra-prediction modes. That is, the intra-prediction component 324 performs intra-prediction in which tests based on multiple intra-prediction modes and transform unit sizes are performed on CUs in an LCU using previously encoded neighboring prediction units from the buffer 328 to choose the best intra-prediction mode for each prediction unit in the CU based on a coding cost.

To perform the tests, the intra-prediction component 324 may begin with the CU structure provided by the coding control. The intra-prediction component 324 may divide each CU indicated in the CU structure into prediction units according to the unit sizes of the intra-prediction modes and into transform units according to the transform block sizes and calculate the coding costs for each prediction mode and transform block size for each PU. For coding efficiency, the intra-prediction component 324 may also decide to alter the CU structure by further partitioning one or more of the CUs in the CU structure. That is, when choosing the best prediction modes, in addition to testing with the initial CU structure, the intra-prediction component 324 may also chose to divide the larger CUs in the initial CU structure into smaller CUs (within the limits of the recursive quadtree structure), and calculate coding costs at lower levels in the coding hierarchy. If the intra-prediction component 324 changes the initial CU structure, the modified CU structure is communicated to other components that need the information. Further, the coding costs of the intra-predicted prediction units and the associated transform block sizes are also provided to the mode decision component 326.

The mode decision component 326 selects between the motion-compensated inter-predicted prediction units from the motion compensation component 322 and the intra-predicted prediction units from the intra-prediction component 324 based on the coding costs of the prediction units and the picture prediction mode provided by the mode selector component. The decision is made at CU level. Based on the decision as to whether a CU is to be intra- or inter-coded, the intra-predicted prediction units or inter-predicted prediction units are selected, accordingly.

The output of the mode decision component 326, i.e., the predicted PU, is provided to a negative input of the combiner 302 and to a delay component 330. The associated transform block size is also provided to the transform component 304. The output of the delay component 330 is provided to another combiner (i.e., an adder) 338. The combiner 302 subtracts the predicted prediction unit from the current prediction unit to provide a residual prediction unit to the transform component 304. The resulting residual prediction unit is a set of pixel difference values that quantify differences between pixel values of the original prediction unit and the predicted PU. The residual blocks of all the prediction units of a CU form a residual CU block for the transform component 304.

The transform component 304 performs block transforms on the residual CU to convert the residual pixel values to transform coefficients and provides the transform coefficients to a quantize component 306. The transform component 304 receives the transform block sizes for the residual CU and applies transforms of the specified sizes to the CU to generate transform coefficients.

The quantize component 306 quantizes the transform coefficients based on quantization parameters (QPs) and quantization matrices provided by the coding control component and the transform sizes. The quantize component 306 may also determine the position of the last non-zero coefficient in a TU according to the scan pattern type for the TU and provide the coordinates of this position to the entropy encoder 334 for inclusion in the encoded bit stream. For example, the quantize component 306 may scan the transform coefficients according to the scan pattern type to perform the quantization, and determine the position of the last non-zero coefficient during the scanning/quantization.

The quantized transform coefficients are taken out of their scan ordering by a scan component 308 and arranged sequentially for entropy coding. The scan component 308 scans the coefficients from the highest frequency position to the lowest frequency position according to the scan pattern type for each TU. In essence, the scan component 308 scans backward through the coefficients of the transform block to serialize the coefficients for entropy coding. As was previously mentioned, a large region of a transform block in the higher frequencies is typically zero. The scan component 308 does not send such large regions of zeros in transform blocks for entropy coding. Rather, the scan component 308 starts with the highest frequency position in the transform block and scans the coefficients backward in highest to lowest frequency order until a coefficient with a non-zero value is located. Once the first coefficient with a non-zero value is located, that coefficient and all remaining coefficient values following the coefficient in the highest to lowest frequency scan order are serialized and passed to the entropy encoder 334. In some embodiments, the scan component 308 may begin scanning at the position of the last non-zero coefficient in the TU as determined by the quantize component 306, rather than at the highest frequency position.

The ordered quantized transform coefficients for a CU provided via the scan component 308 along with header information for the CU are coded by the entropy encoder 334, which provides a compressed bit stream to a video buffer 336 for transmission or storage. The header information may include the prediction mode used for the CU. The entropy encoder 334 also encodes the CU and prediction unit structure of each LCU.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures. To determine the reconstructed input, i.e., reference data, the ordered quantized transform coefficients for a CU provided via the scan component 308 are returned to their original post-transform arrangement by an inverse scan component 310, the output of which is provided to a dequantize component 312, which outputs a reconstructed version of the transform result from the transform component 304.

The dequantized transform coefficients are provided to the inverse transform component 314, which outputs estimated residual information which represents a reconstructed version of a residual CU. The inverse transform component 314 receives the transform block size used to generate the transform coefficients and applies inverse transform(s) of the specified size to the transform coefficients to reconstruct the residual values.

The reconstructed residual CU is provided to the combiner 338. The combiner 338 adds the delayed selected CU to the reconstructed residual CU to generate an unfiltered reconstructed CU, which becomes part of reconstructed picture information. The reconstructed picture information is provided via a buffer 328 to the intra-prediction component 324 and to an in-loop filter component 316. The in-loop filter component 316 applies various filters to the reconstructed picture information to improve the reference picture used for encoding/decoding of subsequent pictures. The in-loop filter component 316 may, for example, adaptively apply low-pass filters to block boundaries according to the boundary strength to alleviate blocking artifacts causes by the block-based video coding. The filtered reference data is provided to storage component 318.

Figure 4:
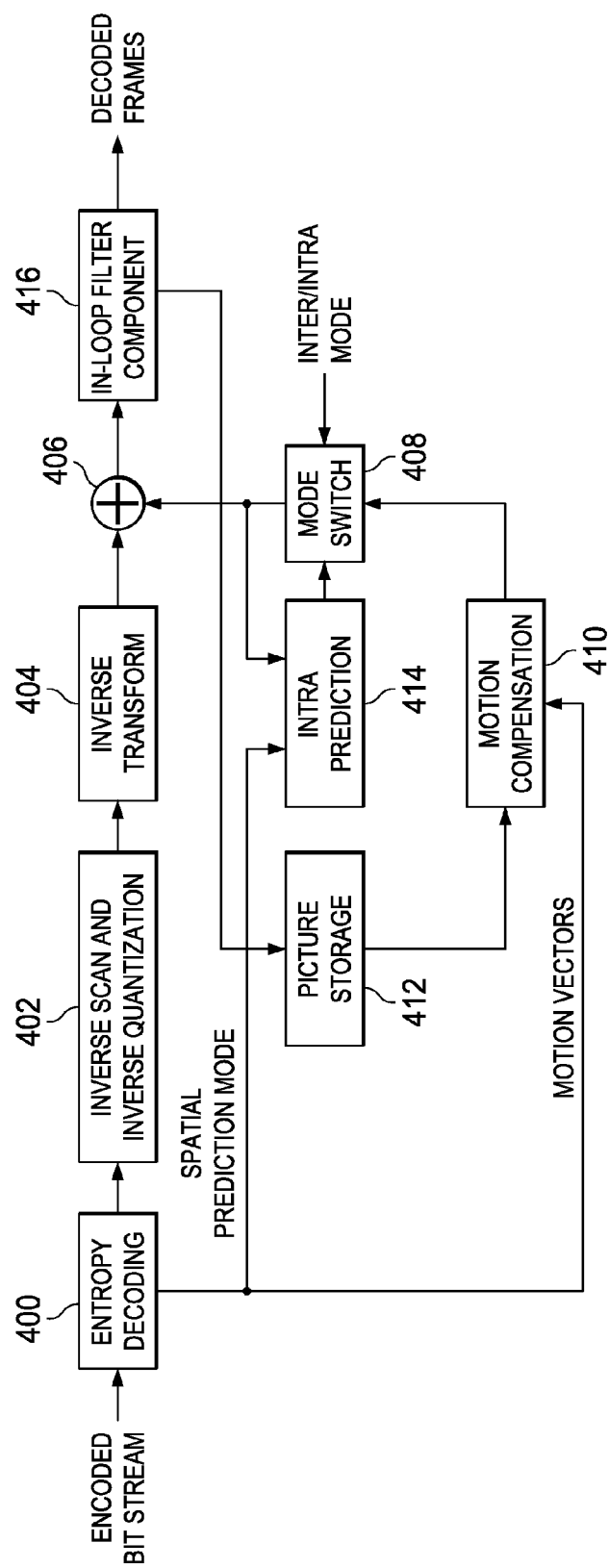
FIG. 4 is a block diagram of a video decoder.

FIG. 4 shows a block diagram of an example video decoder. The video decoder operates to reverse the encoding operations, i.e., entropy coding, quantization, transformation, and prediction, performed by the video encoder of FIG. 3 to regenerate the pictures of the original video sequence. In view of the above description of a video encoder, one of ordinary skill in the art will understand the functionality of components of the video decoder without detailed explanation.

The entropy decoding component 400 receives an entropy encoded (compressed) video bit stream and reverses the entropy coding to recover the encoded PUs and header information such as the prediction modes and the encoded CU and PU structures of the LCUs. If the decoded prediction mode is an inter-prediction mode, the entropy decoder 400 then reconstructs the motion vector(s) as needed and provides the motion vector(s) to the motion compensation component 410.

The inverse scan and inverse quantization component 402 receives entropy decoded quantized transform coefficients from the entropy decoding component 400, inverse scans the coefficients to return the coefficients to their original post-transform arrangement, i.e., performs the inverse of the scan performed by the scan component 308 of the encoder to reconstruct quantized transform blocks, and de-quantizes the quantized transform coefficients. The forward scanning in the encoder is a conversion of the two dimensional (2D) quantized transform block to a one dimensional (1D) sequence; the inverse scanning performed here is a conversion of the 1D sequence to the two dimensional quantized transform block using the same scanning pattern as that used in the encoder.

The inverse transform component 404 transforms the frequency domain data from the inverse scan and inverse quantization component 402 back to the residual CU. That is, the inverse transform component 404 applies an inverse unit transform, i.e., the inverse of the unit transform used for encoding, to the de-quantized residual coefficients to produce the residual CUs.

A residual CU supplies one input of the addition component 406. The other input of the addition component 406 comes from the mode switch 408. When an inter-prediction mode is signaled in the encoded video stream, the mode switch 408 selects predicted PUs from the motion compensation component 410 and when an intra-prediction mode is signaled, the mode switch selects predicted PUs from the intra-prediction component 414.

The motion compensation component 410 receives reference data from storage 412 and applies the motion compensation computed by the encoder and transmitted in the encoded video bit stream to the reference data to generate a predicted PU. That is, the motion compensation component 410 uses the motion vector(s) from the entropy decoder 400 and the reference data to generate a predicted PU.

The intra-prediction component 414 receives reference data from previously decoded PUs of a current picture from the picture storage 412 and applies the intra-prediction computed by the encoder as signaled by the intra-prediction mode transmitted in the encoded video bit stream to the reference data to generate a predicted PU.

The addition component 406 generates a decoded CU by adding the predicted PUs selected by the mode switch 408 and the residual CU. The output of the addition component 406 supplies the input of the in-loop filter component 416. The in-loop filter component 416 performs the same filtering as the encoder. The output of the in-loop filter component 416 is the decoded pictures of the video bit stream. Further, the output of the in-loop filter component 416 is stored in storage 412 to be used as reference data.

Figure 5:
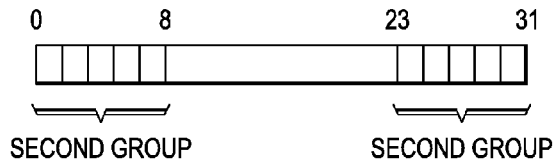
FIG. 5 is an embodiment depicting band offset group classification.

There are two kinds of offsets, namely band offset (BO) and edge offset (EO). BO classifies pixels by intensity interval of the reconstructed pixel, while EO classifies pixels based on edge direction and structure. For BO, the pixel is classified into one of two categories, the side band or central band, as shown in FIG. 5. FIG. 5 is an embodiment depicting band offset group classification.

Figure 6:
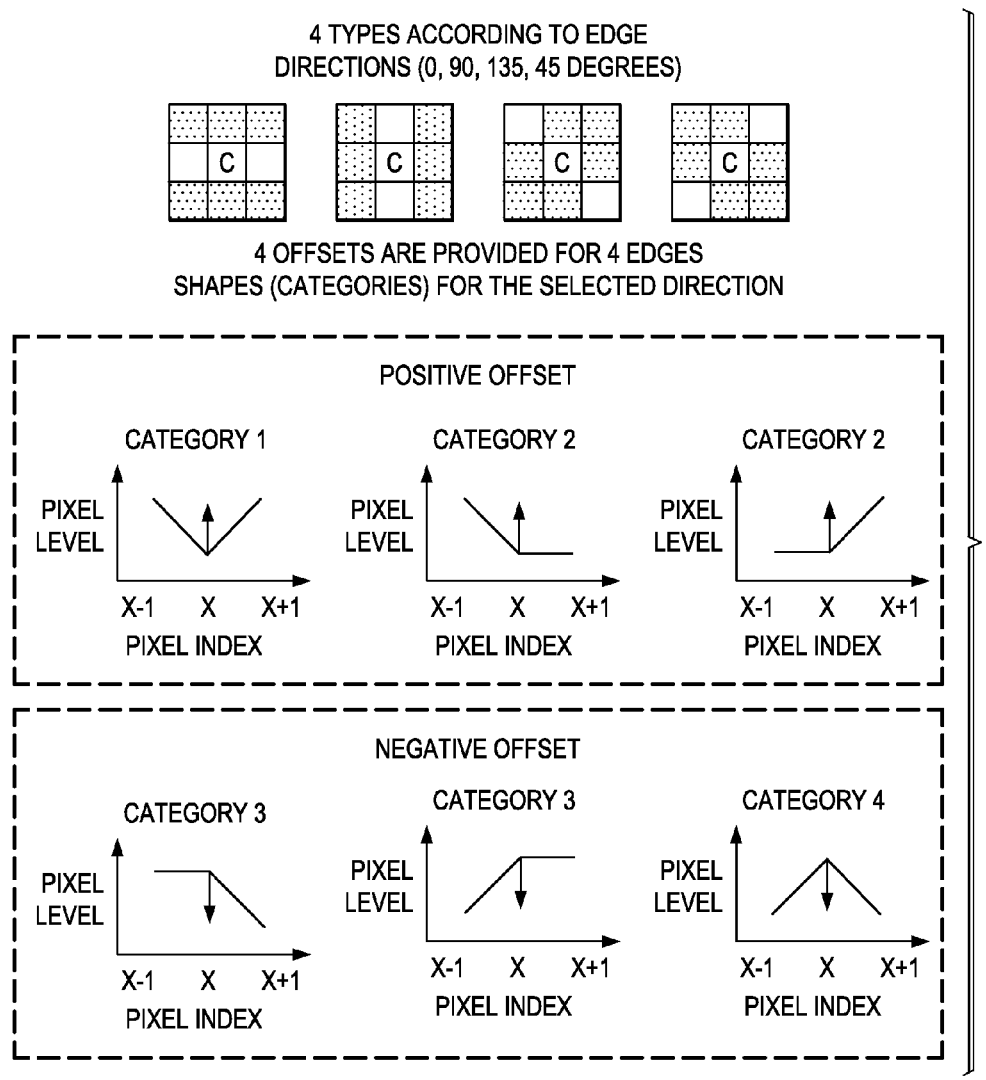
FIG. 6 is an embodiment depicting edge offset pixel classification patterns.

FIG. 6 is an embodiment depicting edge offset pixel classification patterns. For edge offset, the pixels can be filtered in one of four directions, as shown in FIG. 6. For each direction, the pixel is classified into one of five categories based on the value of c, where c is the intensity value of the current reconstructed pixel. The category number can be calculated as sign(p0−p1)+sign (p0−p2), where p0 is current pixel and p1 and p2 are neighboring pixels.

c<2 neighboring pixels;

c<1 neighbor && c==1 neighbor;

c>1 neighbor && c==1 neighbor;

c>2 neighbors; and none of above (c=either neighbor).

On the encoder side, the SAO is LCU-based processing to estimate the offsets for a LCU. Each LCU is allowed to switch between BO and EO. Thus, the encoder can signal the following to the decoder for a LCU:

sao_type_idx=type of SAO sao_offset=sao_offset value

Table 1 describes in more detail type of SAO or speciation of NumSaoClass:

TABLE 1

| sao_type_idx | NumSaoCategory | Edge type (informative) |
|---|---|---|
| 0 | 0 | Not applied |
| 1 | 4 | 1D 0-degree edge |
| 2 | 4 | 1D 90-degree edge |
| 3 | 4 | 1D 135-degree edge |
| 4 | 4 | 1D 45-degree edge |
| 5 | 16 | Central band |
| 6 | 16 | Side band |

For each LCU, a sao_type_idx is signaled followed by offset values for each category.

Figure 7:
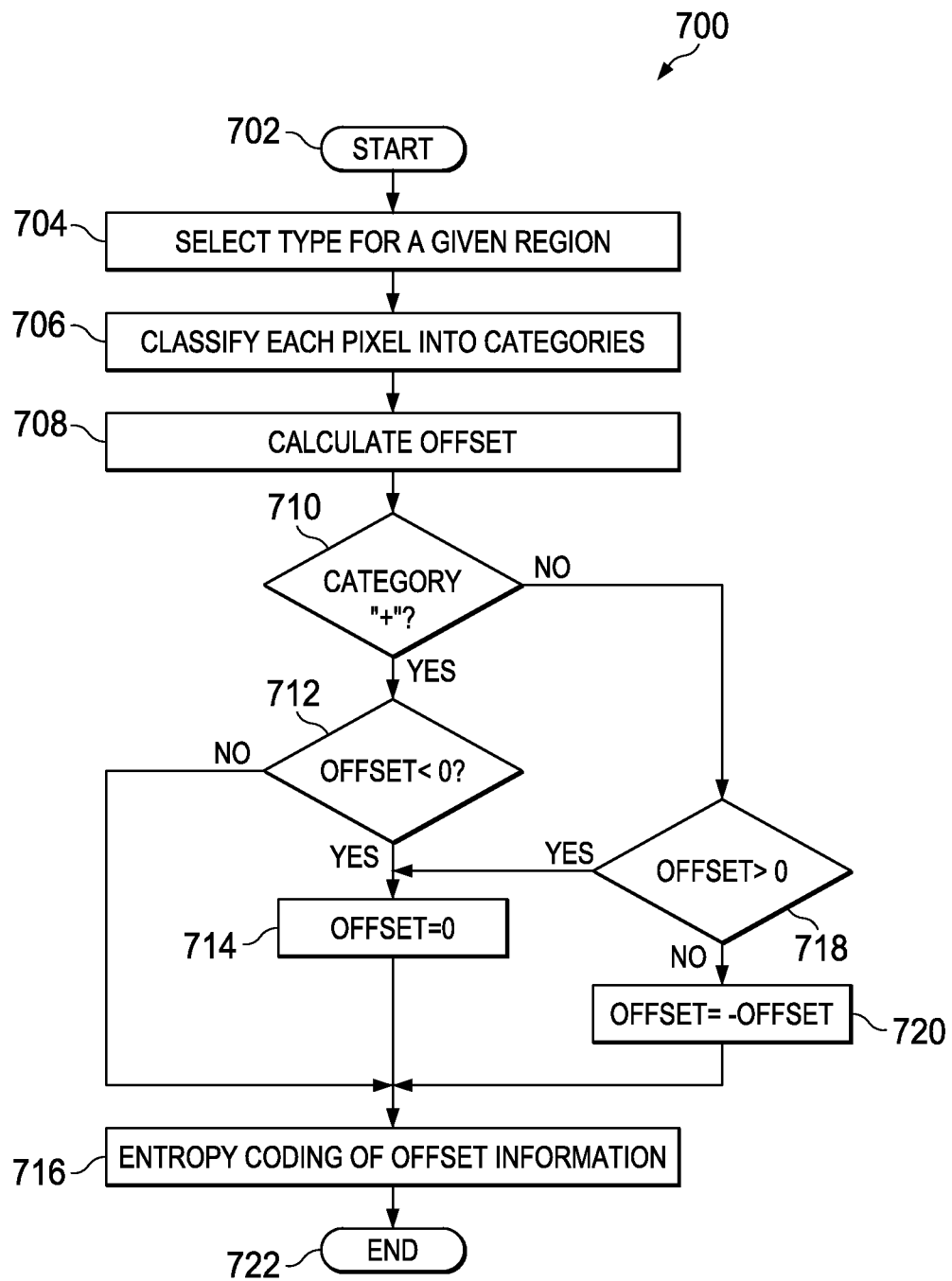
FIG. 7 is an embodiment depicting a flow diagram of a method for encoding procedure using a reconstructed signal.

In one embodiment, a method and/or apparatus compensates for quantization error using the reconstructed signal by adding offset to each pixel. FIG. 7 is an embodiment depicting a flow diagram of a method 700 for encoding procedure using a reconstructed signal. The method starts at step 702 and proceeds to step 704. At step 704, the method 700 selects the type for a give region (e.g. LCU). At step 706, the method 700 classifies each pixel into categories. At step 708, the method 700 calculates the offset. At step 710, the method 700 determines if the category is positive. If the category is positive, the method 700 proceeds to step 712, wherein the method 700 determines if the offset is less than zero. If the offset is less than zero, the method 700 proceeds to step 714, wherein the offset is set to zero and proceeds to step 716. If the offset is not less than zero, the method 700 proceeds to step 716.

If the category is determined to be not positive in step 710, the method proceeds to step 718, wherein the method 700 determines if the offset is greater than zero. If the offset is greater than zero, the method 700 proceeds to step 714 wherein the offset is set to zero and the method 700 proceeds to step 716. If the offset is not greater than zero, the method 700 proceeds to step 720, wherein the offset is set to a negative value of the offset and the method 700 proceeds to step 716. At step 716, the method 700 performs determines the entropy coding of offset information. The method 700 ends at step 722. Steps 708-716 maybe performed for each category.

As shown in FIG. 7, an image or a video frame is divided into regions. A quad-tree structure can be used to divide regions. Or a fixed-size block, e.g., LCU, can be used. For each region edge offset type is selected according to edge structure in the region. Each pixel is classified into predefined categories. The category is defined according to the sign of difference between the current reconstructed pixel value and that of neighboring ones as described in the previous section. The offset for each category can be calculated by taking the average of differences between the original pixel and the reconstructed one which fall into each category.

Accordingly, the level of the current pixel and neighboring pixel will form different shapes for each category, as shown in FIG. 6. In case of category 1 and category 2, the level of current pixel is lower than the neighboring ones. Therefore, the offset value tends to have plus sign. On the other hand, in case of category 3 and 4, the level of current pixel is higher than the neighboring ones. Therefore, the offset value tends to have minus sign. However, when the sign of the offset is reversed, this means that the difference between the current pixel and neighboring ones becomes larger, which may potentially cause visual artifact. Thus, the sign of the offset is restricted according to category. Specifically, for category 1 and 2, or "+" category, the offset is set larger than or equal to 0. If it is smaller than 0, it is set to 0. On the other hand, category 3 and 4, or "−" category, the offset is set as 0 or negative one. If it is larger than 0, it is set to 0. In this way, the visual artifact can be effectively removed.

Since the sign is determined according to category, there is usually no need to include sign information into bitstream. Therefore, the absolute value of the offset is usually entropy coded. Hence, avoiding the use of coding sign information, coding efficiency improvement is achieved. In one embodiment, such a solution may be used with band offset, in which sign value may be coded and included into bitstream.

Figure 8:
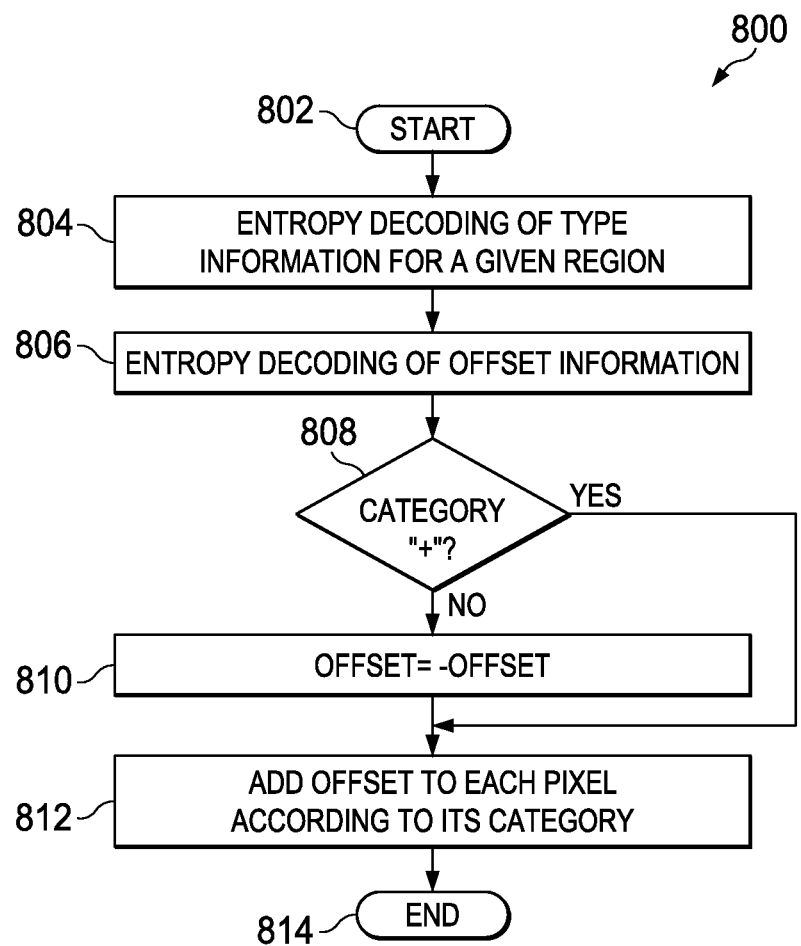
FIG. 8 is an embodiment depicting a flow diagram for a method for region adaptive offset compensation decoding.

FIG. 8 is an embodiment depicting a flow diagram for a method for region adaptive offset compensation decoding. The method 800 starts at step 802 and proceeds to step 804, wherein the method 800 determines the entropy coding of type information for a given region. At step 806, the method 800 determines the entropy coding of offset information. At step 808, the method 800 determines if the category is positive. If the category is positive, the method 800 proceeds to step to step 812. If the category is not positive, the method 800 proceeds to step 810 and then proceeds to step 812. At 810, the method 800 sets the offset to a negative value. At step 812, the method 800 adds the offset to each pixel according to the category. The method 800 ends at step 814. Steps 806-810 maybe performed for each category.

In one embodiment, after decoding offset value for each category, its sign is determined according to the category. For "+" category offset, there is no sign change. For "−" category offset, the decoded value is converted into negative one with same absolute value. Usually, after deriving the offset values, the value is added to the reconstructed pixel value according to its category.

In one embodiment, such a solution may be incorporated into an encoder with sign coding. For example, for "+" category offset, the offset values may be restricted to be in the range of [0, max_abs_offset] in the encoder side, where max_abs_offset is the maximum absolute value of offset allowed in the encoder side. Hence, a "+" sign is usually encoded. On the contrary, for "−" category offset, the offset values may be restricted to be in the range of [−max_abs_offset, 0] and usually encode a "−" sign.

In general, other restriction may be imposed on the range of offset values, for example, [−c, max_abs_offset] and [−max_abs_offset, c] for "+" category and "−" category, respectively, where c is zero or positive value (much) less than max_abs_offset.

Figure 9:
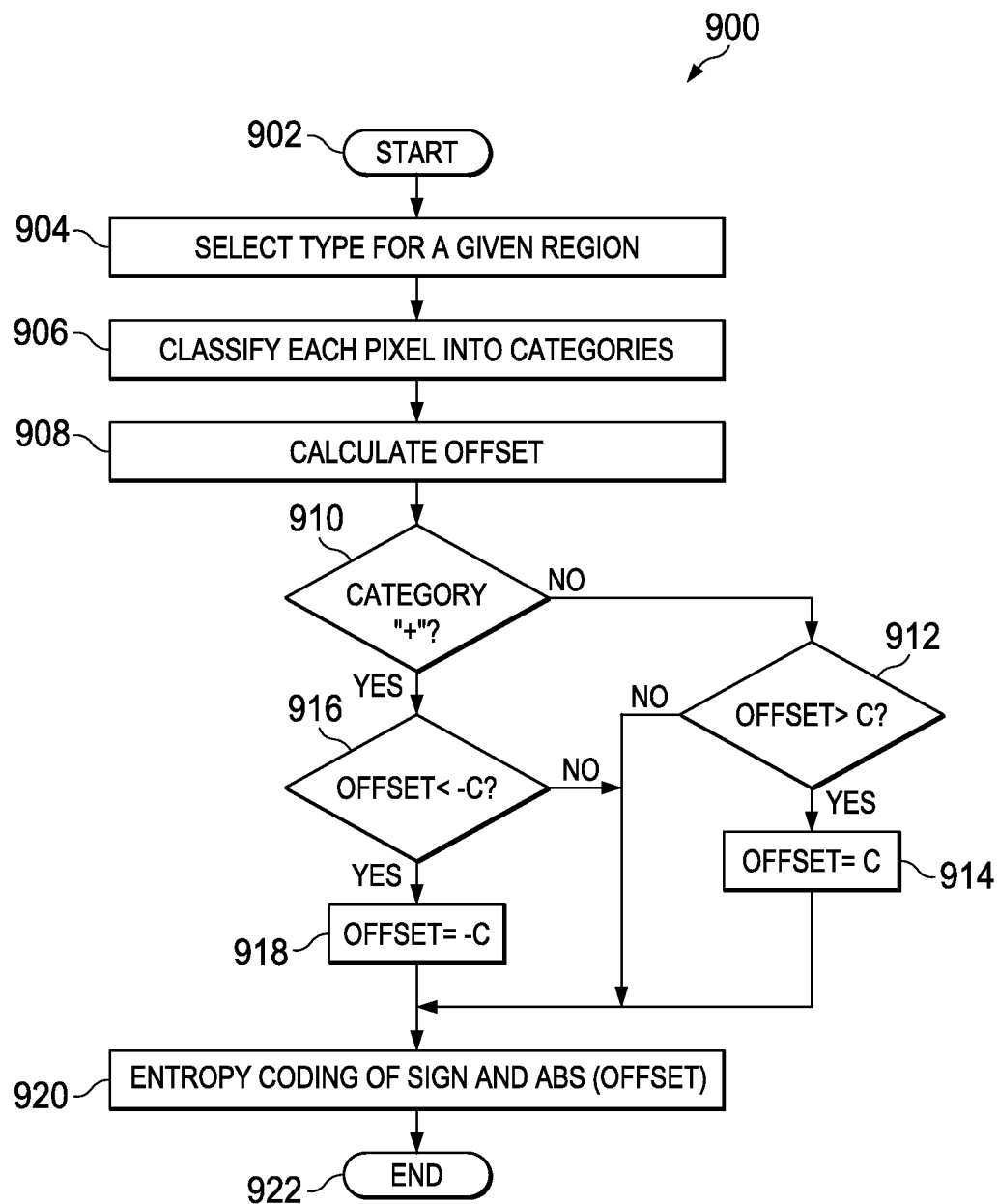
FIG. 9 is an embodiment depicting a flow diagram of a method for general region adaptive offset compensation encoding.

FIG. 9 is an embodiment depicting a flow diagram of a method 900 for general region adaptive offset compensation encoding. Method 900 starts at step 902 and proceeds to step 904. At step 904, the method 900 selects a type for a region. At step 906, the method 900 calculates the offset. At step 910, the method 900 determines if the category is positive. If the category is not positive, the method 900 proceeds to step 912, wherein the method 900 determines if the offset is greater than a positive value of a threshold. If the offset is greater, then the method 900 proceeds to step 914, wherein the offset is set to be a positive value of the threshold and proceeds to step 920. If it is not greater, the method 900 proceeds to step 920. If the category is positive, the method 900 proceeds to step 916, wherein the method 900 determines if the offset is less than a negative value of the threshold. If the offset is less, then the method 900 proceeds to step 918, wherein the offset is set to be a negative value of the threshold and proceeds to step 920. If it is not less, the method 900 proceeds to step 920. At step 920, the method 900 determines the entropy coding of sign and the absolute value of the offset. The method 900 ends at step 922.

While the foregoing is directed to embodiments of the present invention, other and further embodiments of the invention may be devised without departing from the basic scope thereof, and the scope thereof is determined by the claims that follow.

What is claimed is:

1. A system comprising:
   a video capture component;
   a video encoder component coupled to the video capture component, the video encoder component configured for:
      dividing video information pertaining to a picture into coding units;
      determining a sample adaptive edge offset type for a coding unit; and
      determining an offset value for a plurality of categories of the sample adaptive edge offset type for the coding unit;
   an entropy encoder coupled to the video encoder, the entropy encoder configured for encoding the sample adaptive edge offset type, and a magnitude of the offset value for each category of the sample adaptive edge offset type for the coding unit, without encoding a sign of the offset values; and
   a transmitter coupled to the entropy encoder and configured for transmitting entropy encoded data.

2. The system of claim 1, the video encoder component configured for:
   reconstructing pixel values for the coding unit;
   determining a sample adaptive edge offset type for a coding unit using the reconstructed pixel values; and
   determining an offset value for a plurality of categories of the sample adaptive edge offset type for the coding unit using the reconstructed pixel values.

3. The system of claim 1, the video encoder component configured for generating a merge signal indicating the coding unit is to utilize sample adaptive offset parameters from another coding unit.

4. The system of claim 1, the video encoder component configured for generating a sample adaptive offset edge type for the coding unit indicating an edge direction for the edge type sample adaptive offset filtering.

5. The system of claim 1, the video encoder component configured for generating a sample adaptive offset type index (sao_type_idx) value for the coding unit indicating whether edge type sample adaptive offset filtering is to be applied to the coding unit.

6. The system of claim 1, the video encoder component configured for generating a sample adaptive offset type index (sao_type_idx) value for the coding unit indicating an edge direction for the edge type sample adaptive offset filtering.

7. The system of claim 1, the video encoder component configured for generating a sample adaptive offset type index (sao_type_idx) value for the coding unit indicating both that edge type sample adaptive offset filtering is to be applied to the coding unit and an edge direction for the edge type sample adaptive offset filtering.

8. The system of claim 7, the video encoder component configured for limiting the sample adaptive offset value to zero or greater for at least one category.

9. The system of claim 7, the video encoder component configured for limiting the sample adaptive offset value to zero or less for at least one category.

10. The system of claim 7, the video encoder component configured for limiting the sample adaptive offset value to zero or less for at least one category and to zero or greater for at least one other category.

11. The system of claim 7, the video encoder component configured for determining an offset value for a plurality of categories, the plurality of categories determined by a relationship between a pixel and two neighboring pixels, the two neighboring pixels determined by an edge filter direction.

12. A system comprising:
a receiver configured for receiving an entropy encoded bit stream;
a decoder component coupled to the receiver and comprising:
an entropy decoding component configured for receiving the entropy encoded bit stream and reversing the entropy encoding from the entropy encoded bit stream to yield a decoded bit stream comprising residuals and sign-less sample adaptive offset values for a plurality of categories of a coding unit;
an addition component configured for receiving the residuals and generating reconstructed pixel values for the coding unit;
an in-loop filter component configured for performing edge type sample adaptive offset filtering, comprising:
classifying each of a plurality of reconstructed pixel values of a coding unit into a category; and
adjusting reconstructed pixel values of a first category by increasing the reconstructed pixel values by a first sample adaptive offset value and adjusting the reconstructed pixel values of a second category by decreasing the reconstructed pixel values by a second sample adaptive offset value; and
a display connected to the decoder, the display configured for receiving a signal representing the adjusted reconstructed pixel values and displaying an image based on the adjusted reconstructed pixel values.

13. The system of claim 12, the decoder component configured for extracting a merge signal indicating the coding unit is to utilize sample adaptive offset parameters from another coding unit.

14. The system of claim 12, the decoder component configured for extracting a sample adaptive offset edge type for the coding unit indicating an edge direction for the edge type sample adaptive offset filtering.

15. The system of claim 12, the decoder component configured for extracting a sample adaptive offset type index (sao_type_idx) value for the coding unit indicating whether edge type sample adaptive offset filtering is to be applied to the coding unit.

16. The system of claim 12, the decoder component configured for extracting a sample adaptive offset type index (sao_type_idx) value for the coding unit indicating an edge direction for the edge type sample adaptive offset filtering.

17. The system of claim 12, the decoder component configured for extracting a sample adaptive offset type index (sao_type_idx) value for the coding unit indicating both that edge type sample adaptive offset filtering is to be applied to the coding unit and an edge direction for the edge type sample adaptive offset filtering.

18. The system of claim 12, the decoder component configured for adjusting the each reconstructed pixel value based on a category determined by a relationship between a pixel and two neighboring pixels, the two neighboring pixels determined by an edge filter direction.

19. A video decoder comprising:
an entropy decoding component configured for receiving an entropy encoded bit stream and providing a decoded bit stream comprising residual and sign-less sample adaptive offset values for a plurality of categories of a coding unit;
an addition component configured for receiving the residuals and generating reconstructed pixels values for the coding unit; and
an in-loop filter component configured for performing edge type sample adaptive offset filtering comprising:
determining a category for each of a plurality of reconstructed pixel values in the coding unit; and
adjusting at least some of the reconstructed pixel values in the coding unit by increasing the reconstructed pixel values in a first category by a first sample adaptive offset value and decreasing the reconstructed pixel values in a second category by a second sample adaptive offset value.

20. The system of claim 19, the entropy decoding component configured for extracting a merge signal indicating the coding unit is to utilize sample adaptive offset parameters from another coding unit.

21. The system of claim 19, the entropy decoding component configured for extracting a sample adaptive offset edge type for the coding unit indicating an edge direction for the edge type sample adaptive offset filtering.

22. The system of claim 19, the entropy decoding component configured for extracting a sample adaptive offset type index (sao_type_idx) value for the coding unit indicating whether edge type sample adaptive offset filtering is to be applied to the coding unit.

23. The system of claim 19, the entropy decoding component configured for extracting a sample adaptive offset type index (sao_type_idx) value for the coding unit indicating an edge direction for the edge type sample adaptive offset filtering.

24. The system of claim 19, the entropy decoding component configured for extracting a sample adaptive offset type index (sao_type_idx) value for the coding unit indicating both that edge type sample adaptive offset filtering is to be applied to the coding unit and an edge direction for the edge type sample adaptive offset filtering.

25. The system of claim 19, the entropy decoding component configured for adjusting the reconstructed pixel values based on a category determined by a relationship between a pixel and two neighboring pixels, the two neighboring pixels determined by an edge filter direction.

* * * * *